Sept. 5, 1961 C. PAGE ET AL 2,998,969
WEIGHING AND GRADING MECHANISM
Filed Nov. 9, 1953 3 Sheets-Sheet 1

INVENTORS
CLARENCE PAGE
BY GEORGE A. PAGE
*Whittemore Hulbert & Belknap*
ATTORNEYS Sept. 5, 1961     C. PAGE ET AL     2,998,969
WEIGHING AND GRADING MECHANISM
Filed Nov. 9, 1953     3 Sheets-Sheet 2

INVENTORS
CLARENCE PAGE
BY GEORGE A. PAGE

ATTORNEYS

Sept. 5, 1961 C. PAGE ET AL 2,998,969
WEIGHING AND GRADING MECHANISM
Filed Nov. 9, 1953 3 Sheets-Sheet 3

INVENTORS
CLARENCE PAGE
BY GEORGE A. PAGE

Whittemore Hulbert & Belknap

ATTORNEYS

United States Patent Office 2,998,969
Patented Sept. 5, 1961

2,998,969
WEIGHING AND GRADING MECHANISM
Clarence Page and George A. Page, Detroit, Mich., assignors to Page-Detroit, Inc., Southfield Township, Mich., a corporation of Michigan
Filed Nov. 9, 1953, Ser. No. 391,084
3 Claims. (Cl. 177—203)

The invention relates to weighing mechanisms and more particularly to constructions designed for use for grading articles with respect to weight. Such mechanisms may have other uses but we will confine the specific description to a mechanism used for grading eggs.

Within the United States of America, as well as in some other countries, the grading of eggs for marketing is prescribed by law. Such grading is with respect to both minimum individual weight and minimum weight of a group, as for instance per dozen. There are under the laws of most states four main grades, together with two other minor grades respectively above and below the same. The law will not be violated by overweight of eggs in a grade either individually or as a group but, of course, from the sellers standpoint, it is usually desirable to remain as close as possible to the minimum limit prescribed. However, on occasions, dependent upon demand and supply with reference to eggs of a particular grade, it may be desirable to place therein eggs which might legitimately occupy a higher weight grade. Also, as the relative numbers of eggs of larger or smaller weight within grade limits varies from time to time, it may be necessary to increase the weight setting for individual eggs so as not to fall below the group limit.

In view of conditions just described, it is one of the objects of our invention to obtain a construction of weighing device for grading mechanisms which can be easily adjusted for different minimum weight settings. It is a further object to obtain a construction having a series of simultaneously operating weighing devices and in which all may be simultaneously and equally adjusted for a change in setting by a single operating member. Still further it is an object of the invention to obtain a construction of weighing device which in use is in unstable equilibrium, the center of gravity being above the fulcrum. This will lesson oscillations which occur in balances which have the center of gravity below the fulcrum to be in stable equilibrium.

With these objects in view, the invention consists in various features of construction as hereinafter set forth and illustrated in the accompanying drawings in which FIG. 1 is a cross-section through one of the graders of the grading mechanism on line 1—1, FIG. 3;

Figure 1:
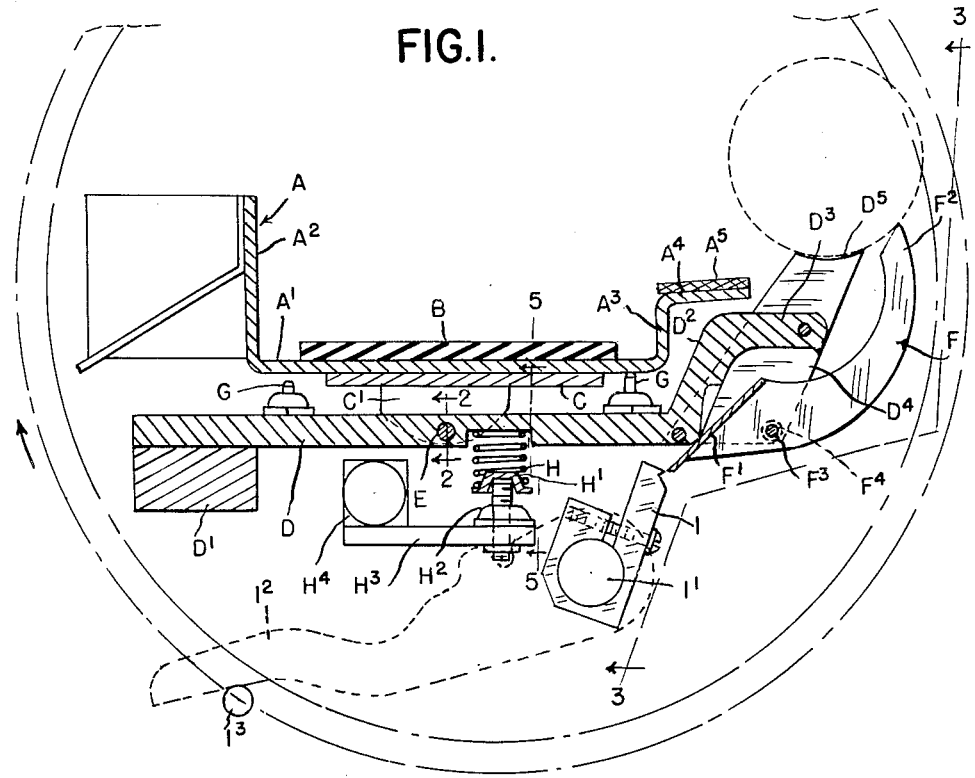
Figure 2:
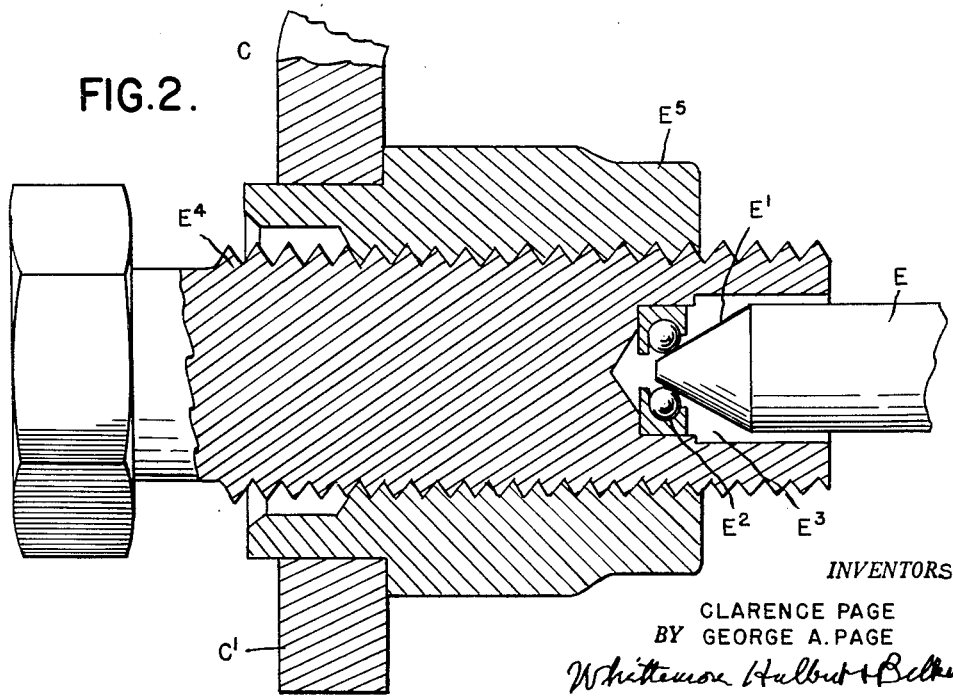
FIG. 2 is an enlarged section on line 2—2, FIG. 1, showing the ball bearing fulcrum.
Figure 4:
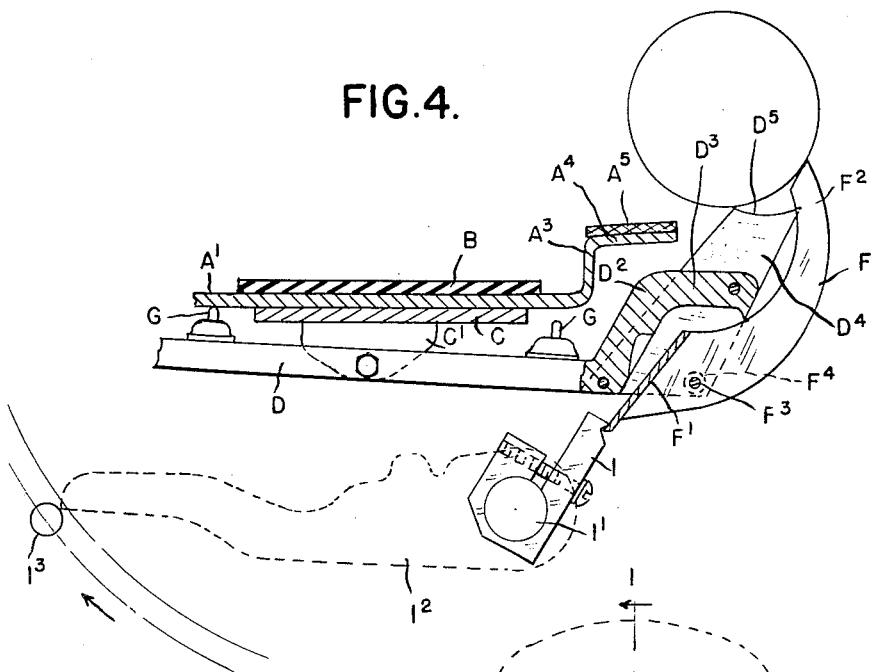
FIG. 4 is a view similar to a portion of FIG. 1 illustrating the operation of the kick-off mechanism for an egg which has depressed the beam.
Figure 3:
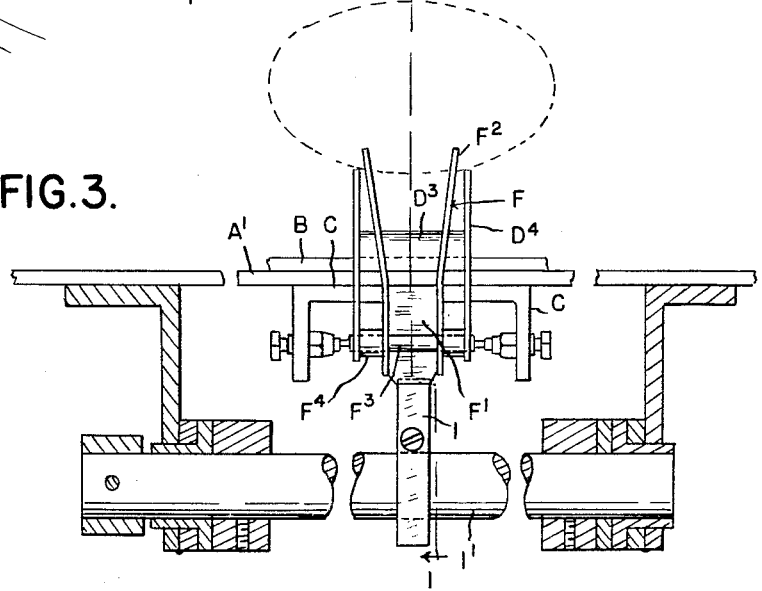
FIG. 3 is an elevation partly in section on line 3—3, FIG. 1.
Figure 5:
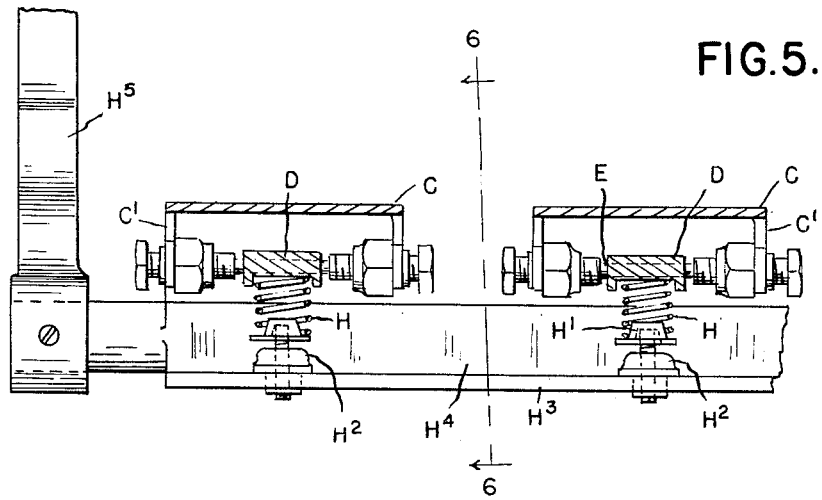
FIG. 5 is a section on line 5—5, FIG. 1.
Figure 6:
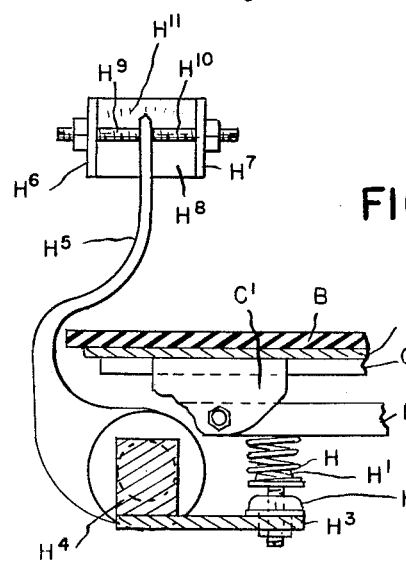
FIG. 6 is a section on line 6—6, FIG. 5.

Our improved weighing and grading mechanism when used for the grading of eggs is similar in general organization to that forming the subject matter of a co-pending application for patent by George A. Page, Serial No. 170,387, filed June 26, 1950, issued January 17, 1956, No. 2,731,146. However, in this application we have illustrated only a single weighing device with associated mechanism for grading the eggs deposited thereon. It will be understood that a series of such weighing devices are arranged side by side to simultaneously operate upon eggs fed thereto. As shown in FIG. 1, A is a trough shaped frame member having a bottom portion $A'$, an upwardly extending flange $A^2$ at one side thereof and at the other side an upwardly extending flange $A^3$ of lesser height than the flange $A^2$ and terminating in an outwardly extending slightly inclined shelf portion $A^4$. B is a conveyor of the endless belt type, one portion of which travels over the bottom $A'$ from end to end thereof and has a return portion (not shown) beneath the same. C is a U-shaped bracket member secured to the portion $A'$ beneath the same. D is a balance beam which extends between the flanges $C'$ of the bracket C and is fulcrumed thereon. Instead of employing a knife edge pivot for a fulcrum, as is quite common in scale constructions, the fulcrum is formed by a pin E extending through a transverse bore in the beam and having conical end portions $E'$. These end portions are each journalled in a minute ball bearing $E^2$ which is mounted within a recess $E^3$ in a threaded member $E^4$. The latter engages a correspondingly threaded bearing $E^5$ which is secured to the depending flange $C'$ of the member C. This fulcrum is quite free from friction and is capable of transmitting stresses from the beam other than those due to weight, as will be later described.

On one end of the beam D is fixedly mounted a weight $D'$ and at the opposite end the beam is formed with an upwardly inclined portion $D^2$ and an outwardly extending portion $D^3$. To these portions are secured side flanges $D^4$ formed of sheet metal, which flanges project above the portion $D^3$ and end in concave arcuate bearings $D^5$ on which an egg may rest. Each arc is of a radius not greater than that of the circular portion of a minimum sized egg resting thereon and consequently the center of gravity of the egg will be exactly positioned with respect to the distance from the fulcrum of the beam. Between the side flanges $D^4$ and beneath the portion $D^3$ of the beam there is arranged a kick-off lever F which also is formed of sheet metal and has a depending U-shaped portion $F'$ and upwardly extending spaced arms $F^2$. The lever is fulcrumed on a pin $F^3$ extending across, between and secured to the flanges $D^4$ and spacer sleeves $F^4$ surrounding this pin centers the lever between said flanges. The lever is normally held by gravity with the U-shaped portion $F'$ bearing against the inclined portion $D^2$ of the beam and in this position the upper ends of the arms $F^2$ will slightly clear an egg of maximum size which is resting on the flanges $D^4$. Thus, a slight rocking of the lever in a counter-clockwise direction will kick the egg off from its arcuate bearings $D^5$ on the flanges $D^4$, causing it to drop first on a cushion $A^5$ secured to the inclined shelf $A^4$, and from here to roll onto the conveyor belt B. However, this kick-off is only actuated when the weight of the egg has depressed the beam as will be later described. Angular movement of the beam is limited by stop pins G which are secured to the beam on opposite sides of the fulcrum and are adapted to contact with the under-surface of the portion $A'$ of the member A. These stop pins are preferably formed of suitable material which will produce a minimum rebound after contact with its cooperating member. The pins may be threaded to engage a correspondingly threaded bearing in the beam and thus are capable of adjustment to give just the clearance desired for rocking of the beam. As has been previously stated the balance is of the unstable equilibrium type which is produced by locating the axis of the fulcrum below the center of gravity of the beam when an egg is resting thereon. Thus, whenever the weight of the egg exceeds the reaction of the balance supporting the same that end of the beam will be depressed to the amount permitted by the setting of the stop pins G. It is, however, necessary to provide adjustment means to set this reaction for the particular grade of eggs desired. This has usually been accomplished by adjusting the weight towards or from the fulcrum of the beam, but where there is a series of parallelly arranged weighing devices all simultaneously operating, each must be individually adjusted for any change in the setting thereof. We have, therefore, devised a construction in which the weight D' on the beam D is in fixed position so that the reaction thereof cannot be altered and constitutes a non-variable reactance. The reaction of the beam is, however, augmented by impressing thereon an auxiliary force which may be adjusted in magnitude and constitutes a variable minor reactance. As illustrated a helical spring H is placed with one end in a recess on the underside of the beam spaced to the right of the fulcrum. The opposite end of the spring engages the head H' which in turn rests upon an abutment member $H^2$. The latter is on a rock-arm $H^3$ extending from a rock-shaft $H^4$ which is common to the rock-arms of all of the balances of the series. It is thus evident that whenever it is desired to change the setting of the balances to correspond to a selected minimum limit in the weight of the eggs, this may be effected by a rocking of the shaft $H^4$ which will produce the same alteration in resilient pressure of the spring on the beam in each of the balances. In other words, the total reactance of each of the balances will be the same. The rock shaft may be operated by an arm $H^5$ at one end thereof which extends between spaced flanges $H^6$ and $H^7$ on a member $H^8$ which is fixed to the frame. Screws $H^9$ and $H^{10}$, respectively, in the flanges $H^6$ and $H^7$ bear against opposite sides of the end of the lever $H^5$ and by adjusting these screws the lever may be moved to simultaneously and equally adjust the compression of all of the springs H. Calibrations $H^{11}$ on the member $H^8$ will indicate the exact weight of egg which will tip the balance in each setting of the lever.

Thus far nothing has been said as to how the eggs are deposited on the arcuate bearings $D^5$ or how they are removed in case they are not of sufficient weight to depress the beam. As this mechanism forms no part of the instant invention and is substantially the same as that shown in the co-pending application, Serial No. 170,387, above referred to, it will not be described. In general it includes a carrier member travelling through an orbit surrounding the member A and all mechanism mounted thereon. Fingers mounted on this carrier pick up eggs from outside of the orbit and deposit each upon the bearing $D^5$ on one of the balances. In case the beam is not depressed by the weight of the egg deposited thereon, it will later in the cycle be picked up by the carrier of the next adjacent grader which removes it from the bearing $D^5$.

The kick-off levers F of all of the balances will remain inactive as long as the lever is not depressed by the weight of the egg. On the other hand whenever the lever is so depressed it will move the lower end of the portion F' of the lever into the path of a rock-arm I. Similar rock-arms I are provided for all of the kick-off levers and all of these arms are mounted on a common shaft I'. This shaft is further provided with an actuating rock-arm $I^2$ which extends into the path of a member $I^3$ having cyclic movement with the mechanism which deposits the eggs on the balances. The timing is such that the rocking of the arm $I^2$ will occur subsequent to the depression of the beams by eggs thereon and consequently all of the depressed eggs will be simultaneously kicked off from the bearings $D^5$ and deposited upon the conveyor belt B. This will carry them away from the balances and in conjunction with cooperating conveying means (not shown) will remove them to the desired point for storage. The eggs deposited on the balances which are less than the predetermined minimum weight so as not to depress the beams will be subsequently removed by means (not shown).

What we claim as our invention is:

1. A plurality of apparatus for grading members of variable weights by predetermined minimum individual weights, each apparatus including a weighing device having a non-variable major reactance for exerting the greater part of the weighing force and also having an adjustable minor reactance for variably supplementing the weighing force, said plurality of apparatus having common means for adjusting all of said variable reactances simultaneously and equally to correspondingly change the weight setting of each weighing device, said non-variable reactance for each of said weighing devices being a fulcrumed beam with a weight thereon a fixed distance from the fulcrum, said adjustable minor reactance being a helical spring bearing against said beam and against an abutment at its opposite end, said common means for adjusting all of said variable reactances simultaneously and equally consisting of a rock shaft, and arms on said rock shaft forming said spring abutments.

2. A plurality of apparatus for grading members of variable weights by predetermined minimum individual weights, each apparatus including a weighing device having a non-variable major reactance for exerting the greater part of the weighing force and also having an adjustable minor reactance for variably supplementing the weighing force, said plurality of apparatus having common means for adjusting all of said variable reactances simultaneously and equally to correspondingly change the weight setting of each weighing device, said non-variable reactance for each of said weighing devices being a fulcrumed beam with a weight thereon a fixed distance from the fulcrum, said adjustable minor reactance being a compression spring bearing against said beam and against an abutment at its opposite end, said common means for adjusting all of said variable reactances simultaneously and equally consisting of a rock shaft, and arms on said rock shaft forming said spring abutments.

3. A plurality of apparatus for grading members of variable weights by predetermined minimum individual weights, each apparatus including a weighing device having a non-variable major reactance for exerting the greater part of the weighing force and also having an adjustable minor reactance for variably supplementing the weighing force, said plurality of apparatus having common means for adjusting all of said variable reactances simultaneously and equally to correspondingly change the weight setting of each weighing device, said non-variable reactance for each of said weighing devices including a fulcrumed beam, said adjustable minor reactance being a helical spring bearing against said beam and against an abutment at its opposite end, said common means for adjusting all of said variable reactances simultaneously and equally consisting of a rock shaft, and arms on said rock shaft forming said spring abutments.

References Cited in the file of this patent

UNITED STATES PATENTS

| | | |
|---|---|---|
| 73,273 | Willoughby | Jan. 14, 1868 |
| 703,244 | Evans | June 24, 1902 |
| 2,116,895 | Howard | May 10, 1938 |
| 2,568,255 | Scheiser | Sept. 18, 1951 |
| 2,590,704 | Howard | Mar. 25, 1952 |
| 2,692,133 | Niederer et al. | Oct. 19, 1954 |
| 2,802,659 | Williams | Aug. 13, 1957 |

FOREIGN PATENTS

| | | |
|---|---|---|
| 340,154 | Great Britain | Dec. 24, 1930 |